T. Cole,
Making Wooden Screws.
Nº 2,356.   Patented Nov. 12, 1841.
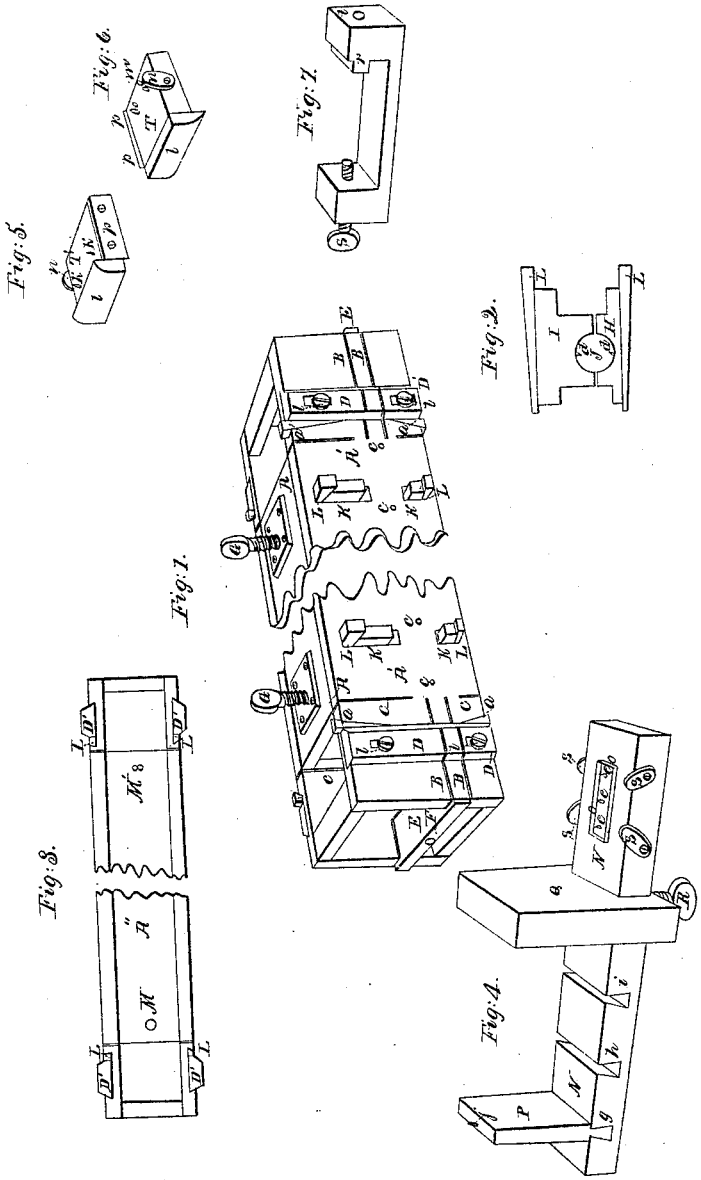

UNITED STATES PATENT OFFICE.

THOMAS COLE, OF GREENSBURG, INDIANA.

MANNER OF CUTTING TENONS AND BORING HOLES IN THE RAILS OF BEDSTEADS.

Specification of Letters Patent No. 2,356, dated November 12, 1841.

*To all whom it may concern:*

Be it known that I, THOMAS COLE, of Greensburg, in the county of Decatur, in the State of Indiana, have invented a new and improved mode of manufacturing bedsteads by means of a tenoning and boring box in which the rails to be tenoned and bored are to be placed for the purpose of cutting the tenons and of boring the respective holes for screws, pins, and mortises, and I also facilitate the same operation by means of a gage of a peculiar construction for laying out the mortises on the posts, and employ, likewise, other auxiliary apparatus or tools to aid in carrying on the work, and which tenoning and boring box and the other apparatus or tools hereinafter described may be used, under proper modification in the manufacturing of other articles of furniture and in various operations in joinery; and I do hereby declare that the following is a full and exact description thereof.

In the accompanying drawing, Figure 1, is a perspective view of the two extremities of my tenoning and boring box, the middle portion being omitted, as it consists merely of the boards by which the proper length is given to it, which must be such as is sufficient to receive a side, or a head and foot, rail. Its width and height, in the clear, must be such as readily to admit the largest stuff of which the rails are to be made. The plank of which it is formed should be about an inch and a quarter thick.

A, A', are two sides of the box.

B, B, are saw kerfs at each end, to receive the saw by which the sides of the tenons are to be cut, and C, C, the kerfs for cutting the shoulders in part. The kerfs B, B, may be eight or nine inches long, and may extend clear up to the shoulder of the tenon, but the kerfs C, C, should not approach the tenon more nearly than within about half an inch, the cutting of these being completed after the rail is removed from the box. By this means, the tenons will be cut perfectly true and out of wind, and the shoulders will be exactly in a range with each other. As the saws by which the tenons are cut will differ in thickness, and the kerfs themselves may be widened by use, I employ sliding gage pieces on each side of the box, as shown at D, D', which are fitted into dovetail, or other grooves, and may be fastened by wedges *a*, *a*, at their sides, or by tightening screws *b*, *b*; these sliding pieces may be adjusted and affixed so as to suit the thickness of the saw. E, is a piece of stuff of the thickness of the tenon, and extending across the box, between the kerfs B, B. Through the pieces E, at each end, there is a hole F, of a proper size, and in the right situation, for the bit by which the rail is to be bored for the admission of the bedstead screw, and which boring is to be effected while the rail is in its place within the box. There are also holes *c*, *c*, *c*, made along the side of the box, corresponding in size, number, and distance, with the pins which are to be inserted in the rails, and through these the pin holes are to be bored in the rail.

G, G, are tightening screws by which the rail is to be held in place while it is being tenoned and bored.

Rails that are round, or octagonal, may be readily tenoned and bored in this box by making a suitable provision for holding them in place. For this purpose I use, in lieu of the screws G, G, division pieces, such as are shown in Fig. 2. The divided pieces, H, I, having an opening J, made in them, are to be received within mortises K, K, and to be held by wedges L, L, so as to cross the box. To hold the rail firmly, there may be points *d*, *d*, driven into the partition pieces. Fig. 3, shows the side A″, of the box, opposite to A, Fig. 1. Through this side there are made holes shown at M, M, for boring in the place of the mortise for inserting the screw nuts. An inch hole M, or two or three smaller holes M′, will answer this purpose, serving to admit the bit, opposite to the holes for the bed screws.

The tenons made in this box will be uniform in their demensions, and the mortises in which they are to be received will all, consequently, be of one size; to lay these mortises out rapidly, I have devised a gage of a peculiar construction, shown at Fig. 4. N, N, is a strip of wood, forming a part of the gage. At one end of this I insert four thin plates of steel, as at O, O, which rise about a sixteenth of an inch above the surface of the wood, and have thin cutting edges; these form the outline of the mortise. Within this oblong square I insert three, or more, pins, *e*, *e*, *e*, which project up like the cutting edges from the surface of the wood. When this part of the gage is placed upon that portion of the post where the mortise is to be made, and it is struck upon the back by a mallet, the mortise will be laid out, and the points marked for the insertion of the center bit, to bore for making it. To adapt this gage to definite heights of rails, several dovetail grooves, as at $g$, $h$, $i$, may be made across the piece N, N, to receive a gage block P; three such grooves will probably suffice for all sizes, the piece P, being placed against the bottom of the post, the mortises will all be laid out at one uniform height; instead of, or in addition to, the block P, there may be a sliding cheek Q, furnished with a tightening-screw R, in the ordinary way; and this may be placed at any required distance from the mortise gage.

S, S, are turn buckles, or buttons, which may be placed on the sides of the strips N, N, to bear against the side of the post.

As auxiliary in the operation of laying out the respective parts of a bedstead, I use some other devices which I will now explain. The piece P, Fig. 4, I make of the same thickness with the tenon, and at $j$, I insert a point so situated as that when this end of P, is inserted in the mortise, the pin $j$, will mark the place for boring through the post for the passing of the screw, so as to correspond with the holes for that purpose in the rails. Where eight screws are used this mark will be made a fourth of an inch above, or below, the center of the mortise. A distinct piece of wood may be used for the same purpose, instead of the piece P. When four screws only are to be used, and draw boring is to be performed for pinning the head and foot rails to the posts, I employ a block, the two sides of which T, T', are shown in Figs. 5, and 6.

$k$, $k$ are metallic points, placed at a proper distance from the fence $l$, to impress said boring points when the fence is laid against the edge of the post. The side, Fig. 6, of this block is to be laid upon the tenon, to mark for draw boring through it, and to lay it out of the proper width. The edge $m$, is to be laid against the shoulder of the tenon, with the turn buckle $n$, against its upper edge, and the pins $o$, $o$, will then mark the place for draw boring.

$p$, $p$, is a plate of metal fastened on to one side of the block and having a cutting edge projecting above its surface. The block is of the exact width intended to be given to the tenon, and on striking it the piece of metal $p$, will lay it off so as exactly to fit the mortise.

Fig. 7, is an instrument which I sometimes use for a guide in boring the holes for the screws through the posts; the tenon $r$, fits into the mortise, and is held in place by the screw $s$; at $t$, there is a hole for the passage of the bit. This instrument may be used when, from any cause, it is desired to vary the situation of the screw.

In a bedstead, or other article to be framed and put together in a similar manner, the foregoing apparatus will serve so as to lay out and regulate the parts, as that the mortises and tenons will all fit indiscriminately; and if the nuts and screws are all made to one size, there will not be any occasion to mark any of the parts, as they cannot possibly be misplaced.

Having thus, fully described the nature of my invention, and shown how the same is to be carried into operation, what I claim therein as new, and desire to secure by Letters Patent, is—

The particular manner of combining and arranging the respective parts of the box for receiving the rails, and for cutting the tenons thereon, and for boring the requisite holes therein, without shifting said rail during the operation; the whole being constructed, and operated, substantially as set forth.

THOMAS COLE.

Witnesses:
CHATFIELD HOWELL,
I. T. GIBSON.